US010555120B2

(12) United States Patent
Kernan (10) Patent No.: US 10,555,120 B2
(45) Date of Patent: *Feb. 4, 2020

(54) OFFLINE MAP DOWNLOAD

(71) Applicant: Microsoft Technology Licensing, LLC, Redmond, WA (US)

(72) Inventor: Brian Kernan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/370,310

(22) Filed: Mar. 29, 2019

(65) Prior Publication Data

US 2019/0230469 A1 Jul. 25, 2019

Related U.S. Application Data

(63) Continuation of application No. 15/150,203, filed on May 9, 2016, now Pat. No. 10,299,074.

(51) Int. Cl.
H04W 4/02 (2018.01)
H04W 4/029 (2018.01)
H04W 4/18 (2009.01)

(52) U.S. Cl.
CPC ......... *H04W 4/023* (2013.01); *H04W 4/025* (2013.01); *H04W 4/029* (2018.02); *H04W 4/18* (2013.01)

(58) Field of Classification Search
CPC ....... H04W 4/023; H04W 4/18; H04W 4/029; H04W 4/025
USPC ........ 455/414.1–414.3, 418–420, 456.1–457
See application file for complete search history.

(56) References Cited

U.S. PATENT DOCUMENTS

| 8,368,695 | B2 | 2/2013 | Howell et al. |
| 8,521,593 | B2 | 8/2013 | Gadhia et al. |
| 8,958,818 | B2 | 2/2015 | Rose |
| 9,026,354 | B1 * | 5/2015 | Persson ................. G01C 21/32 701/400 |
| 9,414,222 | B1 * | 8/2016 | Dixon ..................... H04L 67/22 |
| 2002/0155844 | A1 * | 10/2002 | Rankin ................. H04W 4/029 455/456.1 |
| 2007/0219708 | A1 | 10/2007 | Brasche |
| 2007/0239846 | A1 | 10/2007 | Kehdra |
| 2007/0260741 | A1 | 11/2007 | Bezancon |
| 2008/0147311 | A1 | 6/2008 | Zoller et al. |
| 2009/0085803 | A1 | 4/2009 | Mergen |
| 2010/0081450 | A1 | 4/2010 | Ibrahim |
| 2011/0282579 | A1 * | 11/2011 | Uyama ................. G01C 21/32 701/532 |
| 2013/0147820 | A1 | 6/2013 | Kalai et al. |

(Continued)

OTHER PUBLICATIONS

Barker, Philip, "Why use offline maps and how to manage them in HERE for iOS", Published on: Mar. 19, 2015 Available at: http://360.here.com/2015/03/19/why-offline-maps-how-manage-here-ios/.

(Continued)

*Primary Examiner* — Michael Y Mapa
(74) *Attorney, Agent, or Firm* — Holzer Patel Drennan (57) ABSTRACT

A system discloses analyzing global positioning system (GPS) parameters of a mobile device to determine if the mobile device is outside a predetermined range and if it is determined that the mobile device is outside the predetermined range, communicating a notification to the mobile device to download maps on the mobile device using an alternate communication channel.

19 Claims, 6 Drawing Sheets

(56) References Cited

U.S. PATENT DOCUMENTS

| | | | |
|---|---|---|---|
| 2014/0068212 A1 | 3/2014 | Lin | |
| 2014/0082062 A1* | 3/2014 | Bellver | H04L 67/18 709/203 |
| 2014/0228054 A1* | 8/2014 | Rose | H04W 4/024 455/456.3 |
| 2014/0335893 A1 | 11/2014 | Ronen | |
| 2015/0156609 A1 | 6/2015 | Davis | |
| 2015/0345968 A1 | 12/2015 | Wang | |

OTHER PUBLICATIONS

"Sygic-GPS Navigation", Published on: Mar. 13, 2015 Available at: http://www.sygic.com/gps-navigation/features.

Deb, et al., "Offline Navigation System for Mobile Devices", In International Journal of Engineering & Applications, vol. 1, No. 2, Apr. 2010, pp. 30-43.

"maps.me", Retrieved on: Feb. 20, 2016 Available at: http://maps.me/files/MAPS.ME%20User%20Guide%20v5.1.pdf.

* cited by examiner

OFFLINE MAP DOWNLOAD

CROSS-REFERENCE TO RELATED APPLICATIONS

This application is a continuation application of and claims benefit of U.S. Non-Provisional application Ser. No. 15/150,203 entitled "OFFLINE MAP DOWNLOAD" and filed on May 9, 2016, which is incorporated herein by reference in its entirety.

BACKGROUND

Users of mobile devices use such mobile devices for a large number of different purposes, including communicating with other users via text, emails, social network applications, etc., getting information from websites, social networks, mobile applications, etc., purchasing, getting directions, etc. Most of these activities require data to be transferred from and to the mobile device by one of many telecommunication methods, such as cellular communication, communication using WiFi, etc. Depending on the location of the mobile device and a subscription agreement by the user of the mobile device with the providers of the telecommunications network, some form of such communication may be free while other forms of communication may carry varying levels of costs for the user.

SUMMARY

Implementations described herein disclose a method for analyzing global positioning system (GPS) parameters of a mobile device to determine if the mobile device is outside a predetermined range and if it is determined that the mobile device is outside the predetermined range, communicating a notification to the mobile device to download maps on the mobile device using an alternate communication channel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

The technology disclosed herein allows users of mobile devices to use offline maps when the mobile device is detected to be outside of its home range. An offline map may be a map that can be loaded on a device, such as a mobile device, where the offline map 120 is available for use by the device even when the mobile device is not able to communicate using any communication channels. An implementation of the system disclosed herein determines the home range of a mobile device and pings the mobile device periodically to determine if the mobile device is outside the home range. If it is determined that the device is outside the home range, the system determines if the mobile device has alternative communication channel, such as WiFi, available for downloading the offline maps. The system determines the location of the mobile device, such as the city, town, etc., and downloads the offline maps related to the location once the availability of such an alternative communication channel is ascertained.

Figure 1:
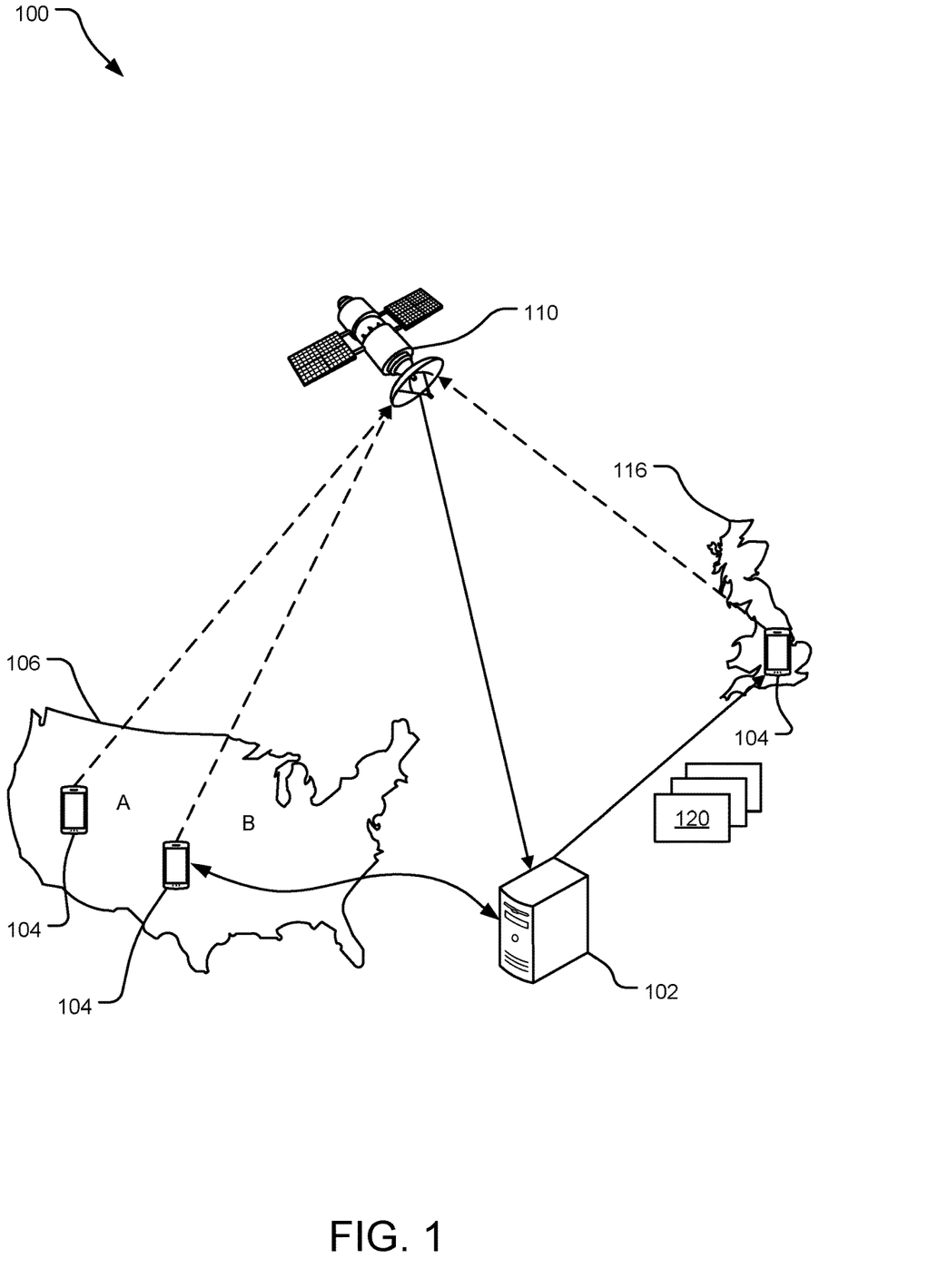
FIG. 1 illustrates an example implementation of a system for providing offline maps to a mobile device based on the location of the mobile device.

FIG. 1 illustrates an example implementation of a system 100 for providing offline maps to a mobile device 104 based on the location of the mobile device 104. The mobile device 104 may be a cellular phone, a smartphone, an iPad, etc., that is configured with a GPS transceiver (not shown) that allows the mobile device 104 to communicate with a GPS satellite 110. Note that while in the illustrated implementation, the mobile device 104 is shown to communicates with a single GPS satellite 110, in an alternative implementation, a network of GPS satellites 110 may be provided. For example, the GPS satellite that communicates with the mobile device 104 may depend on the location of the mobile device 104.

The mobile device 104 may belong to a user that travels around the world. For example, the user of the mobile device 104 may be a resident of the United States and may travel to various locations within the United States. In one implementation, the user may be a subscriber of a telecommunication service provider that provides a free or relatively cheap telecommunication service in a predetermined range to the user. For example, such predetermined range may be a geographic region or a collection of geographic regions. Note that such predetermined range may be contiguous or non-contiguous. As an example, the boundary 106 of the continental United States may be such predetermined range within which the mobile device 104 is able to access telecommunications services from a service provider at such low rate. Such predetermined range 106 may also be referred to as the home range of the mobile device. Thus, as used herein, the term "home range" may refer to a geographic region or collection of geographic regions within which a user may receive a base rate for telecommunications services.

The mobile device 104 may be used for a variety of purposes, including for phone calls, text messaging, checking emails, using one or more mobile applications based on the mobile device 104, for determining the location of the mobile device, data download and upload, etc. For example, a user may use a mapping application based on the mobile device 104 to view the location of the mobile device 104 on a graphical representation of a map, to get direction from one location to another location, etc. Furthermore, such mapping application may also be used to find direction to and or distance to various destinations, such as hotels, museums, etc.

When user requests such mapping information from an application based on the mobile device 104, the mapping application or the mobile device 104 may send a request to a mapping server 102 for data. For example, if the mobile device 104 was located at a location A and wanted to get directions to a location B, the mobile device 104 may send a request to the mapping server 102 with such request and in response get information that may be interpreted by the mapping application of the mobile device 104 to present such direction on a map on a screen of the mobile device 104. The mapping server 102 may generate the appropriate mapping data using various databases, processes, etc., and send such mapping data to the mobile device 104. For example, the mapping server 102 may have current data related to the traffic, road closures, etc., as well as permanent data related to roads, businesses, etc., that can be used in generating the mapping data.

Such communication from the mobile device 104 to the mapping server 102 and back from the mapping server 102 to the mobile device 104 may consume a large amount of data. Furthermore, such communication may also require that there is an active channel of communication open between the mobile device 104 and the server. In one implementation, such channel may be provided via a cellular network (not shown). Alternatively, such channel may be provided by a WiFi communication between the mobile device 104 and another network, such as the Internet (not shown).

If a cellular network were used to communicate between the mobile device 104 and the server 102, such communication may result in data charges to the user of the mobile device 104. Such charges may depend on the network subscription agreement between the user and the network. If the mobile device 104 is outside the home range, the mobile device 104 may not be able to use the cellular network and therefore it may not be able to access the mapping server 102 to get mapping data. For example, a user based in the United States may be traveling to UK 116. In such a case, to get the mapping data using a mapping application, the mobile device 104 may have to access the mapping server 102 via a costly "roaming" service that may be available to the mobile device 104.

The system 100 allows the mobile device 104 to receive offline maps when the mobile device 104 is outside its home range. Specifically, the GPS satellite 110 periodically pings the mobile device 104. The frequency of the pinging may be set by a user of the mobile device 104 as part of device set up. Based on the time it may take to receive the response from the mobile device 104. Specifically, the GPS satellite 110 may analyze the response from the mobile device 104 to determine the latitude and the longitude of the mobile device 104. In one implementation of the system 100, the GPS satellite 100 may communicate the latitude and the longitude of the mobile device 104 to the mapping server 102.

The mapping server 102 may use the latitude and the longitude of the mobile device 104 to determine whether the mobile device 102 is inside or outside the home range. For example, if the user of the mobile device 104 is traveling outside the United States, the mapping server 102 will be able to determine so based on the latitude and the longitude of the mobile device 104. In response to such a determination, the mapping server 102 further analyzes the latitude and the longitude of the mobile device 104 to determine the current location of the mobile device 104. In the illustrated example, such current location may be London, UK 116.

Upon determining that the mobile device 104 is outside its home range 106 and in close proximity of London, UK 116, the mapping server 102 generates various offline maps 120 of London and its vicinity. Such offline maps 120 may be in the form of offline map tiles that store various data about a geographic region, such as London UK 116. For example, the offline maps 120 may include data about the roads, directions, addresses, buildings, hotels, businesses, etc. Specifically, such offline maps 120 provide enough data to a mapping application of the mobile device 104 such that the user of the mobile device 104 is able to use a large number of capabilities of the mapping application without the mobile device 104's access to any communication network such as cellular network, etc.

Once such offline maps 120 are prepared, the mapping server 102 sends a notification to the mobile device 104 about the availability of such offline maps 120. Such notification may be sent to the mobile device 104 via a communication method that does not require the mobile device 104 to have access to the cellular network. For example, such communication may be sent via an application interface that delivers that notification when alternate manners of communications are available to the mobile device 104. Such alternative manners of communication maybe for example, WiFi, Bluetooth communication, near-field communication, Femtocell communication, etc.

Once the mobile device 104 has access to such an alternative communication method, the notification to download the offline maps 120 is presented to the user of the mobile device 104 via an output of the mobile device 104, such as a notification on a screen, a text message, an audio message, etc. Specifically, the notification may be presented to the user of the mobile device 104 such that the user may make a selection whether to download the offline maps 120 or not. If the user selects to download the offline maps 120 using a WiFi connection, the mapping server 102 pushes the offline maps 120 via the WiFi connection of the mobile device 102.

In an alternative implementation, the mapping server 102 also sends one or more additional notifications to the user of the mobile device 104 to see if the user is interested in downloading additional offline maps other than the offline maps 120 that the mapping server 102 has offered to download to the mobile device 104 in the first place. In yet another alternative implementation, the mapping server 102 may be configured to store various information about the user of the mobile device 104, such as the user's preferences, past usage of mapping data, etc. For example, the mapping server 102 may store the past usage of the mapping data based on past requests for maps by the user of the mobile device 104 and determine that the user is interested in museums when the user travels to different locations. In such case, the mapping server 102 may automatically populate the offline maps 120 with museum information. Similarly, if the past usage of the mapping data indicates that the user is generally interested in restaurants when traveling, the mapping server 102 may automatically populate the offline maps 120 with additional information about restaurants in the London area. For example, the mapping server 102 may populate the offline maps with additional information, such as route to the restaurants, restaurant hours, menu, etc., about restaurants before they are downloaded by the user of the mobile device 104. Alternatively, the mapping server may send such additional information to the mobile device 104 such that a mapping application of the mobile device 104 can combine such additional information with the offline maps stored on the mobile device 104.

In an alternative implementation, the mapping server 102 may store the past usage of the mapping data based on past requests for maps by other users having preferences similar to the preferences of the user of the mobile device 104 and determine that generally the users having preferences similar to the user of the mobile device 104 are interested in art galleries when they travel to a given location where the user of the mobile device 104 is traveling. In such a case, the mapping server 102 may automatically populate the offline maps 120 with information about art galleries.

Figure 2:
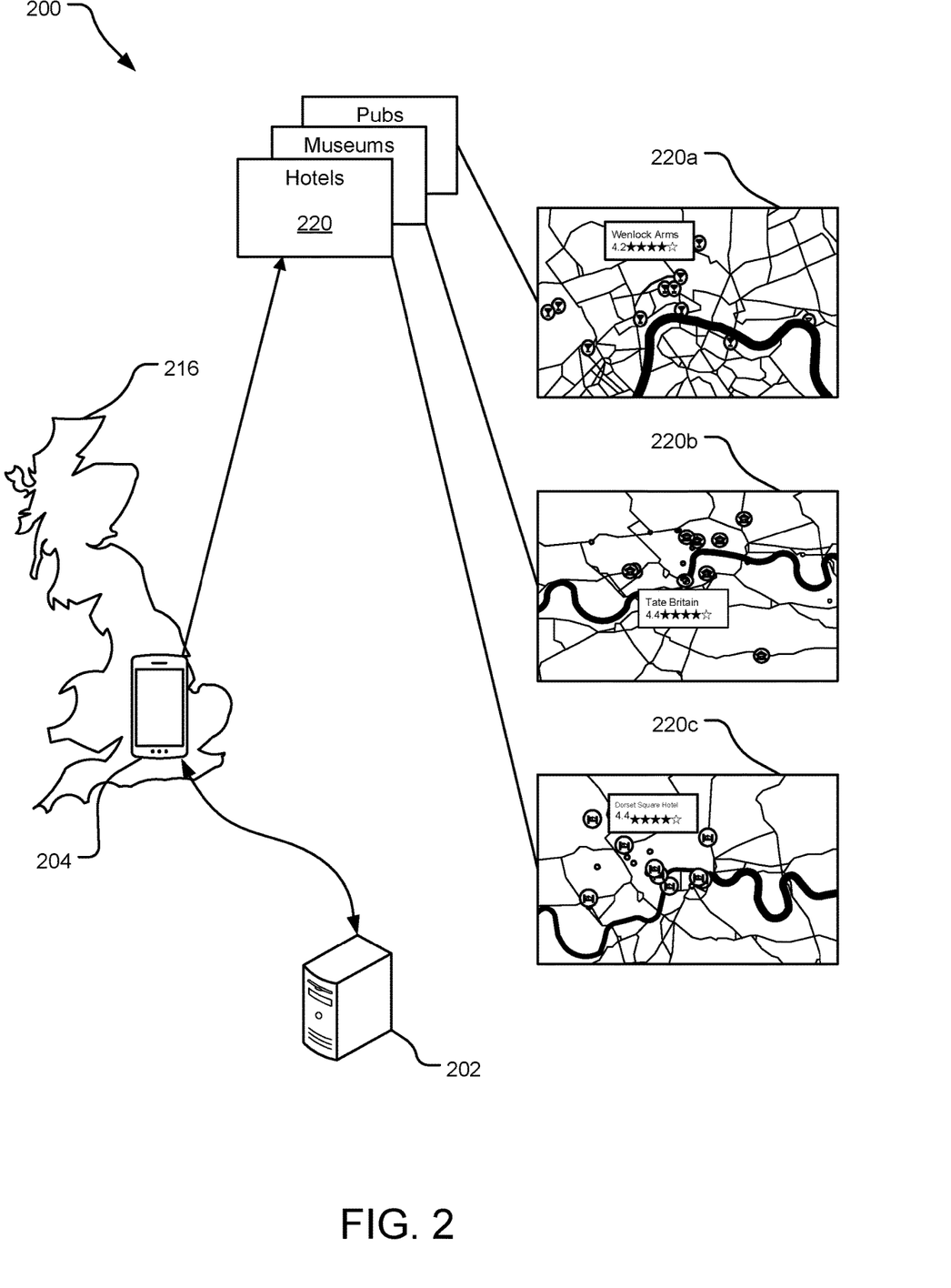
FIG. 2 illustrates an alternate example implementation of a system for providing offline maps to a mobile device based on the location of the mobile device.

FIG. 2 illustrates an alternate example implementation of a system 200 for providing offline maps to a mobile device 204 based on the location of the mobile device 204. Specifically, a mapping server 202 determines that location of the mobile device 204 to be outside a home range (not shown) of the mobile device 204 based on the GPS parameters, such as latitude and longitude, of the mobile device 204. Furthermore, the mapping server 202 may also determine that the mobile device 204 is in London UK, based on the GPS parameters. In such case, the mapping server 202 may send a notification to the mobile device 204 to offer the user of the mobile device 204 to download one or more offline maps 220 when the mobile device is connected to a network. For example, the mapping server 202 may send a notification to the mobile device 204 such that the notification is activated as soon as the mobile device 204 is able to communicate using an alternative communication method such as WiFi, Bluetooth, NFC, etc.

Note that while in the implementation disclosed in FIG. 2, the mapping server 202 determines the location of the mobile device 204 to be outside the home range and sends a notification to the mobile device 204 to download one or more offline maps 220, in an alternative implementation, the mobile device 204 may determine its own location based on the GPS parameters and initiate a request to the mapping server 202 to send one or more offline maps 220 to the mobile device 204. For example, an application residing on the mobile device 204 may be configured to communicate with a GPS module of the mobile device 204 to process the GPS data to determine the location of the mobile device 204. When the mobile device 204 determines that it is located outside its home range, it determines if it is able to communicate using any alternative communication channels, such as WiFi, BlueTooth, NFC, etc. Once such a communication channel is available, the mobile device 204 may send a request to the mapping server 202 for one or more offline maps 220.

In yet another alternative implementation, an application running on the mobile device 204 that requests the offline maps 220 from the mapping server 202 may also communicate with other applications on the mobile device, such as a search engine (Bing®, etc.) to determine one or more user preferences and modify the request for the offline maps 220 based on such user preferences. For example, if past history of the search engine indicates that the user of the mobile device 204 is interested in art galleries, the application may send a request to the mapping server 202 for offline maps 220 with additional data about art galleries.

Specifically, the mapping server 202 offers a variety of offline maps 220 suitable for the user of the mobile device 204. For example, if the mapping server 202 may have stored past usage of a mapping application on the mobile device 204 to determine that the user of the mobile device is interested in various pubs. In which case, the mapping server 202 automatically populates the offline maps 220 with information about pubs (e.g., Wenlock Arms) in the vicinity of the mobile device 204, as shown in the offline map 220*a*. Similarly, an offline map 220*b* includes information about various museums (e.g., Tate Modern) in the vicinity of the mobile device 204 whereas an offline map 220*c* includes information about various hotels (e.g., Dorset Square Hotel) in the vicinity of the mobile device 204.

In one implementation of the system 200, the mapping server 202 not only uses past usage of mapping application or mapping data by the user of the mobile device 202 to decide what information is to be added to the offline maps 220, but it also communicates with and collects user preferences from other applications on the mobile device 202, such as a social networking application, a browsing application, etc., to determine the preferences of the user of the mobile device 204. As a result, the offline maps 220 provided to the user of the mobile device 204 are more useful to the user and include targeted information so as to make more efficient use of short time frames during which alternate communication channels such as WiFi, etc., may be available. For example, the mobile device 204 may have the alternate communication channel available only when the user of the mobile device is in a hotel that provides WiFi. Moreover, in various developing countries, such alternate communication channels, such as WiFi, may have quite low download bandwidth. Furthermore, by populating the offline maps 220 with information that the user of the mobile device 204 is most likely to use, the mapping server 202 reduces the potential needs of the user to ask for additional information while the mobile device 204 is offline. For example, as a result of populating the offline maps 220 with information about art galleries, the user of the mobile device 204 has less need to ask for such information using relatively expensive cellular communication that may result in roaming charges.

In yet another alternative implementation, an application resident on the mobile device 204 may analyze the offline maps 220 stored on the mobile device 204 on a periodic basis to determine if one or more of the offline maps 220 should be deleted. Alternatively, such an application may initiate such analysis of the offline maps 220 stored on the mobile device 204 in response to a change of location of the mobile device 204. Such deletion of the offline maps 220 from the mobile device 204 ensures that the offline maps 220 that may not be relevant to the user of the mobile device 204 are deleted so as to conserve data storage space on the mobile device 204. Alternatively, such deletion of the offline maps 220 may be based on user preferences. Yet alternatively, such deletion of the offline maps 220 may be in response to a timeout, such as a predetermined time period after the offline maps 220 are downloaded on the storage device 204.

Figure 3:
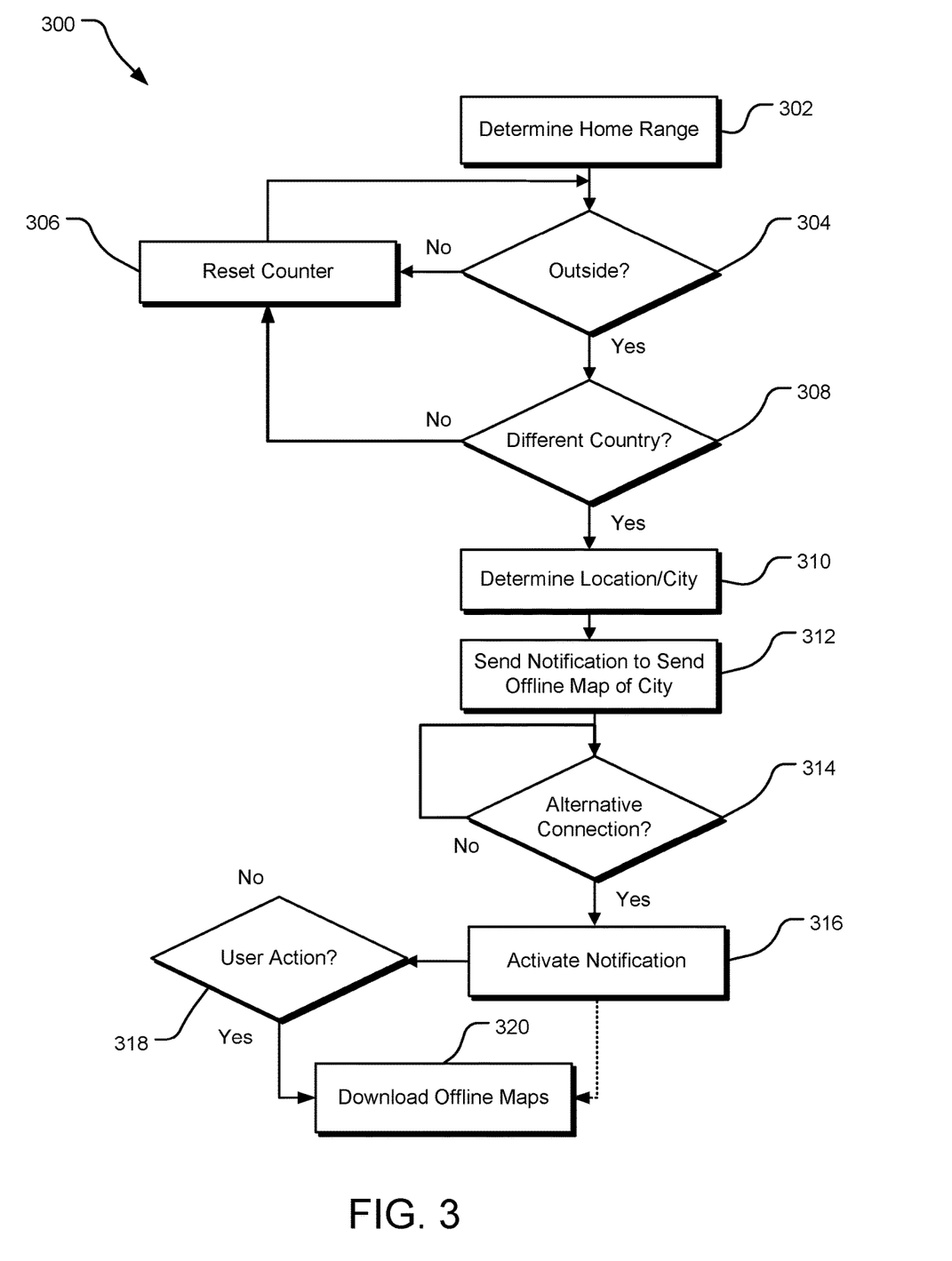
FIG. 3 illustrates example operations for providing offline maps to a mobile device based on the location of the mobile device.

FIG. 3 illustrates example operations 300 for providing offline maps to a mobile device based on the location of the mobile device. An operation 302 determines a home range of the mobile device. The operation 302 may determine the home range based on a parameter of the mobile device, a setting in the mobile device, etc. For example, when the user of the mobile device sets up the mobile device, the user may have established a home location of the mobile device as being, for example, Colorado. In such case, the operation 302 may determine the continental United States to be the home range of the mobile device.

A determining operation 304 may constantly monitor the GPS parameters of the mobile device to determine if the mobile device has moved outside the home range. For example, the operation 304 may ping the mobile device at predetermined intervals to determine the GPS parameters of the mobile device and analyze the GPS parameters to determine current location of the mobile device. The operation 304 compares the current location with the home range of the mobile device to determine if the mobile device is within its home range or not. For example, such determination may involve comparing of the GPS parameters of the mobile device with a range of GPS parameters to determine if the GPS parameters of the mobile device are within such range latitude-wise and longitude-wise. If the operation 304 determines that the mobile device is within its home range, an operation 306 resets a counter and the operation 304 may repeat.

If the operation 304 determines that the mobile device is outside its home range, an operation 308 determines whether the mobile device is in a different country than a home country of the user of the mobile device. Again, such determination of whether the mobile device is in a different country or not may be done by comparison of the GPS parameters of the mobile device with ranges of latitude/longitude for different countries. As an example, the latitude/longitude of the mobile device may fall within a range that indicates that the mobile device is in UK. In one implementation, if the operation 308 determines that the mobile device is in a different country, an operation 310 determines the location of the mobile device including the city, town, etc., where the mobile device is located. For example, if the user of the mobile device is traveling to UK, the location of the mobile device may be London.

An operation 312 sends a notification to the mobile device to send offline maps of the location where the mobile device is located. For example, such notification may be sent to the mobile device by a mapping server via an interface to the mobile device via a mapping application of the mobile device. Alternatively, such notification may be sent via other means, such as a text message, a pop-up notification, etc. The notification may be such that the user of the mobile device can respond to it to activate an action. In one implementation, the notification may be configured such that it is activated only when an alternative communication channel, such as WiFi, NFC, Bluetooth, etc., are available to the mobile device.

An operation 314 determines if such an alternative connection is available for the mobile device to communicate. Once it determines an availability of such an alternative communication channel, an operation 316 activates the notification. In one implementation, an operation 318 determines if a user of the mobile device has taken an action to consent to downloading of the offline maps. If such consent is received, an operation 320 downloads the offline maps. However, in an alternative implementation, the operations 300 do not wait for a consent from the user and in such an implementation, upon activating the notification, the operation 320 may automatically initiate downloading of the offline map. For example, in such a case, an additional operation (not shown) may indicate to the user of the mobile device when the offline map download operation is complete.

Figure 4:
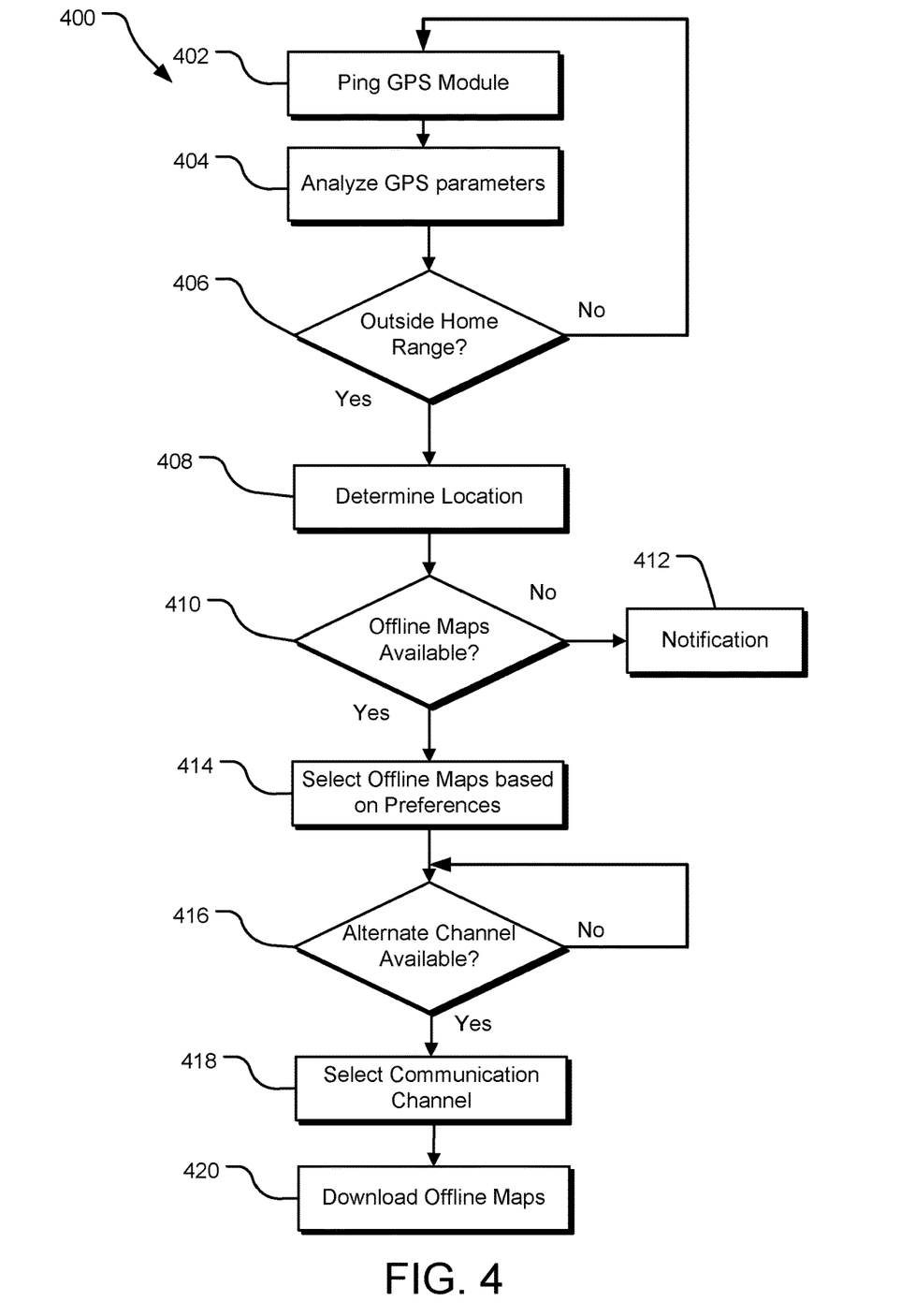
FIG. 4 illustrates alternate example operations for providing offline maps to a mobile device based on the location of the mobile device.

FIG. 4 illustrates alternate example operations 400 for providing offline maps to a mobile device based on the location of a mobile device. An operation 402 pings a GPS module of the mobile device to collect the GPS parameters of the mobile device. For example, such mobile device may be a cellular phone and the GPS parameters collected from its GPS module may be the parameters that allows determination of the latitude/longitude of the mobile device using a triangulation method. An operation 404 analyzes the GPS parameters to determine a current location of the mobile device. Such analysis may further include comparing the current location of the mobile device with a home range of the mobile device. For example, such home range may be the range where the mobile device does not incur roaming charges, higher data charges, etc.

An operation 406 determines if the mobile device is outside the home range. If so, an operation 408 determines the location of the mobile device, such as the city, town, geographic coordinates of the location, etc. For example, if the user of the mobile device is traveling though Peru, the operation 408 determines that the mobile device is in Lima when the GPS parameters of the mobile device indicate so. An operation 410 determines if offline maps are available for the location of the mobile device. For example, if during the user's travel through Peru, the mobile device is located in a rural area of Peru, the operation 410 may determine that such offline maps are not available for such a remote location. In such a case, an operation 412 sends a notification to the mobile device of such unavailability of the offline maps.

If the offline maps are available, an operation 414 selects the offline maps for download. Such selection of the offline maps may be made based on preferences provided by the user of the mobile device, past usage of maps by the user of the mobile device, etc. For example, if the mobile device is indicated to be in Cusco, Peru, given the likelihood of the user traveling from Cusco to Aguas Caliente, the operation 414 may automatically download offline maps of Cusco, Aguas Caliente, the road between the two, etc. Alternatively, the operation 414 may select such maps based on predetermined preferences of the user. For example, the user may have specified that they prefer information about historic sites when travelling abroad, in which case, the operation 414 may select offline maps with information about historic sites near Cusco, or populate the offline maps with additional information about such historic sites.

An operation 416 determines if the mobile device is able to communicate using any alternative channels for communication. For example, such alternative channels may include WiFi, NFC, Bluetooth, Femtocell, etc. An operation 418 selects an appropriate communication channel. For example, a communication channel with the highest throughput for downloading the offline maps may be used. In one implementation, an additional operation (not shown) may select the offline maps to be downloaded by the mobile device based on the selected communication channel and the speed of the selected communication channel. Thus, if the selected communication channel is slow, basic offline maps are selected. On the other hand, if the selected communication channel has large download bandwidth, rich offline maps may be selected. An operation 420 downloads the offline maps to the mobile device.

Figure 5:
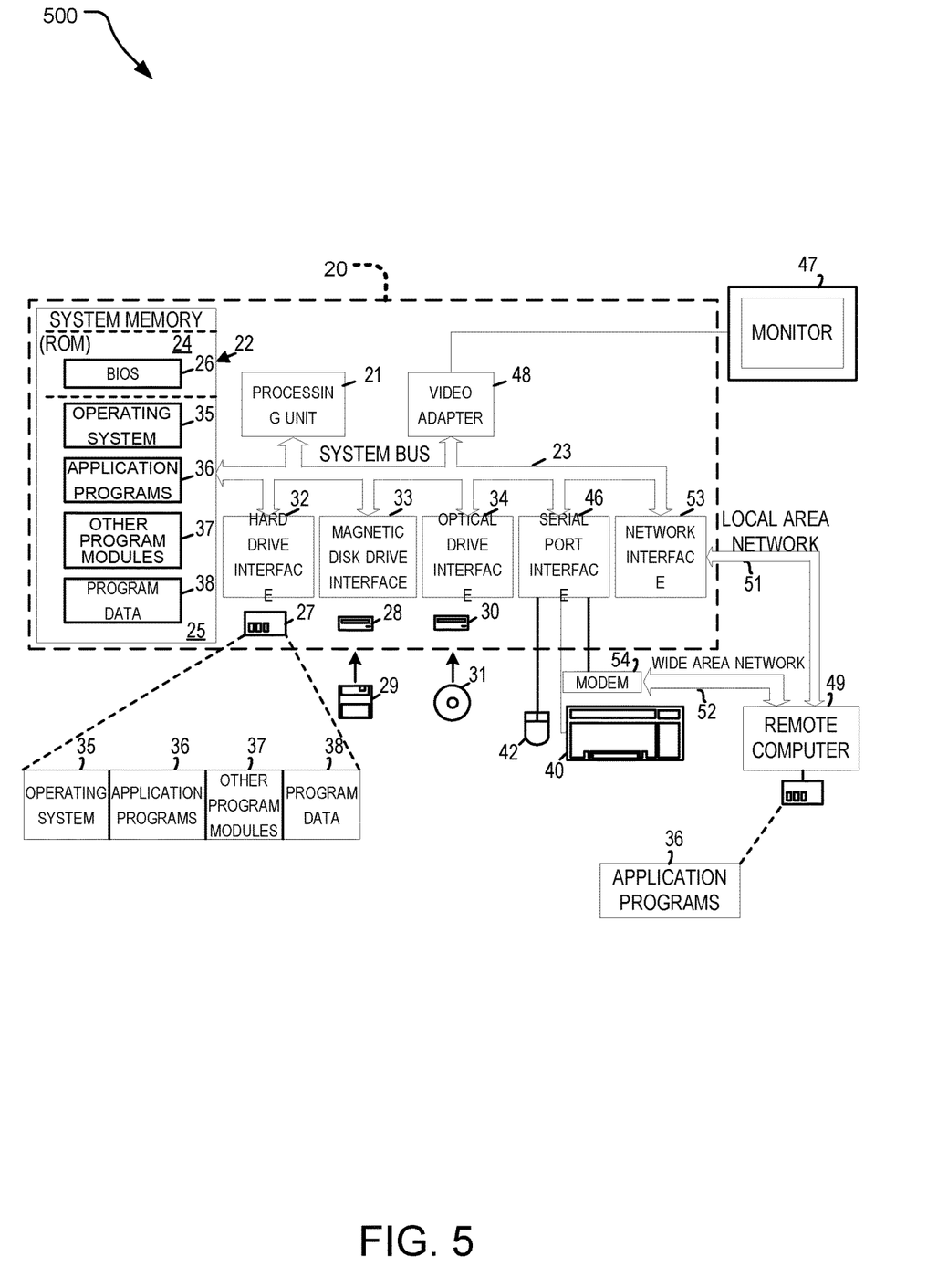
FIG. 5 illustrates an example system that may be useful in implementing the described technology.

FIG. 5 illustrates an example system 500 that may be useful in implementing the described technology for providing offline maps. The example hardware and operating environment of FIG. 5 for implementing the described technology includes a computing device, such as a general purpose computing device in the form of a computer 20, a mobile telephone, a personal data assistant (PDA), a tablet, smart watch, gaming remote, or other type of computing device. In the implementation of FIG. 5, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for providing offline maps may be stored in memory 22 and/or storage devices 29 or 31 and processed by the processing unit 21. Rules for providing offline maps may be stored in memory 22 and/or storage devices 29 or 31 as persistent datastores. For example, an offline map download module may be implemented with instructions stored in the memory 22 and/or storage devices 29 or 31 and processed by the processing unit 21. Similarly, a GPS parameter processing module may also be implemented with instructions stored in the memory 22 and/or storage devices 29 or 31 and processed by the processing unit 21. The memory 22 may be used to store one or more offline maps.

Figure 6:
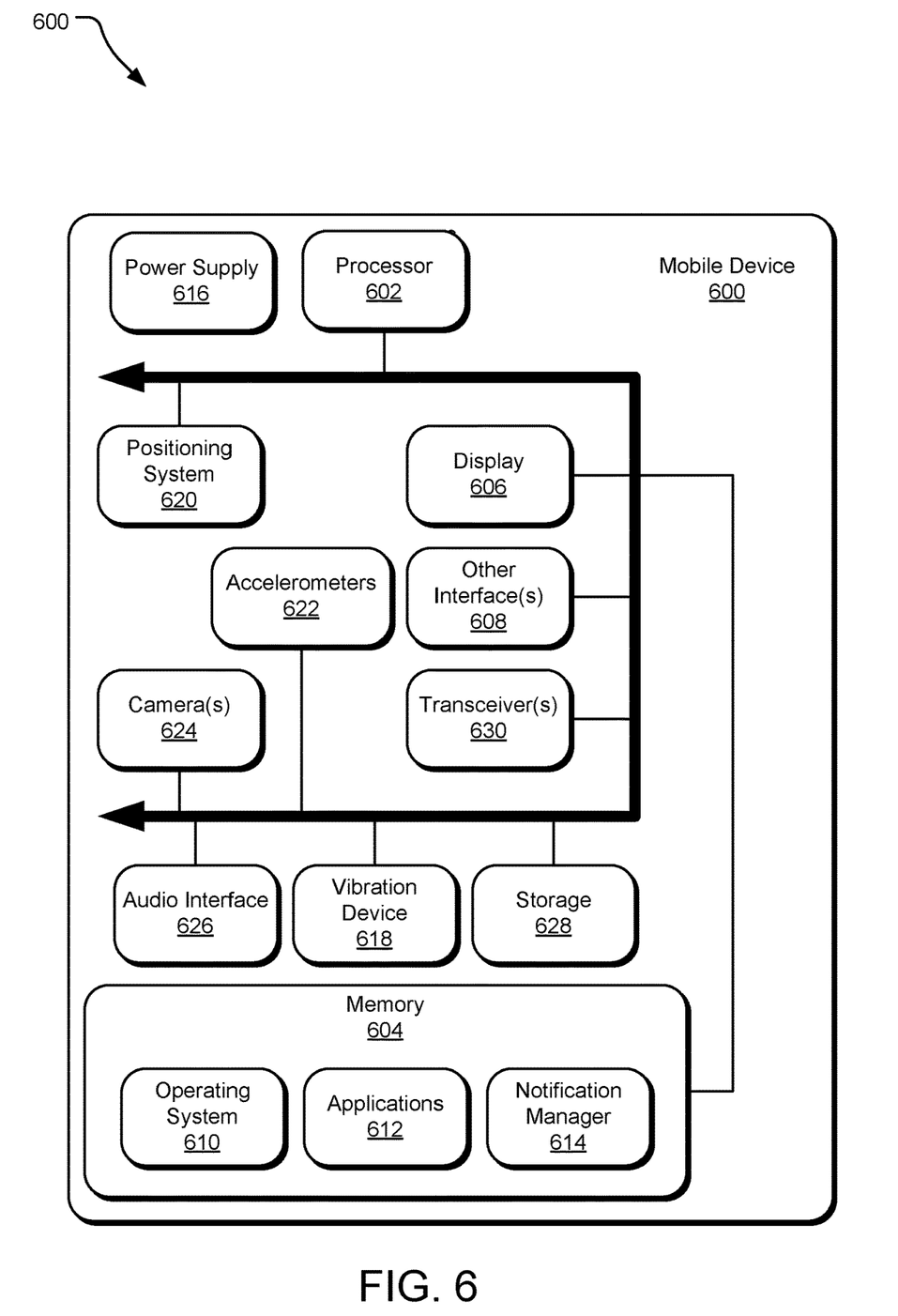
FIG. 6 illustrates an example mobile device that may be useful in implementing the described technology.

FIG. 6 illustrates another example system (labeled as a mobile device 600) that may be useful in implementing the described technology. The mobile device 600 includes a processor 602, a memory 604, a display 606 (e.g., a touchscreen display), and other interfaces 608 (e.g., a keyboard). The memory 604 generally includes both volatile memory (e.g., RAM) and non-volatile memory (e.g., flash memory). An operating system 610, such as the Microsoft Windows® Phone operating system, resides in the memory 604 and is executed by the processor 602, although it should be understood that other operating systems may be employed.

One or more application programs 612 are loaded in the memory 604 and executed on the operating system 610 by the processor 602. Examples of applications 612 include without limitation email programs, scheduling programs, personal information managers, Internet browsing programs, multimedia player applications, etc. A notification manager 614 is also loaded in the memory 604 and is executed by the processor 602 to present notifications to the user. For example, when a promotion is triggered and presented to the shopper, the notification manager 614 can cause the mobile device 600 to beep or vibrate (via the vibration device 618) and display the promotion on the display 606.

The mobile device 600 includes a power supply 616, which is powered by one or more batteries or other power sources and which provides power to other components of the mobile device 600. The power supply 616 may also be connected to an external power source that overrides or recharges the built-in batteries or other power sources.

The mobile device 600 includes one or more communication transceivers 630 to provide network connectivity (e.g., mobile phone network, Wi-Fi®, Bluetooth®, etc.). The mobile device 600 also includes various other components, such as a positioning system 620 (e.g., a global positioning satellite transceiver), one or more accelerometers 622, one or more cameras 624, an audio interface 626 (e.g., a microphone, an audio amplifier and speaker and/or audio jack), and additional storage 628. Other configurations may also be employed.

In an example implementation, a mobile operating system, various applications, and other modules and services may be embodied by instructions stored in memory 604 and/or storage devices 628 and processed by the processing unit 602. User preferences, service options, and other data may be stored in memory 604 and/or storage devices 628 as persistent datastores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The system for offline maps may include a variety of tangible computer-readable storage media and intangible computer-readable communication signals. Tangible computer-readable storage can be embodied by any available media that can be accessed by the remote desktop experience controller 115 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the remote desktop experience controller 115. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

An example system includes a memory, one or more processor units, a plurality of maps stored in the memory, each of the plurality of maps related to a geographic location, a GPS parameter processing module stored in the memory and executable by the one or more processor units, the GPS parameter processing module configured to analyze GPS parameters received from a mobile device to determine a location of the mobile device, and a map download module stored in the memory and executable by the one or more processor units, the map download module configured to determine if the mobile device is outside a predetermined range and if it is determined that the mobile device is outside the predetermined range, further configured to send a notification to the mobile device to download one or more of the plurality of maps.

An example physical article of manufacture includes one or more tangible computer-readable storage media, encoding computer-executable instructions for executing on a computer system a computer process, the computer process comprising determining, using graphical positioning system (GPS) parameters of a mobile device, whether the mobile device is outside its home range, selecting one or more maps related a location of the mobile device outside the home range; and communicating a notification to the mobile device to download the one or more maps.

Another example physical article of manufacture includes one or more tangible computer-readable storage media, encoding computer-executable instructions for executing on a computer system a computer process, wherein the computer process further comprising determining availability of a communication channel for the mobile device, where the communication channel allows downloading data without incurring data charges for the mobile device.

Yet another example physical article of manufacture includes one or more tangible computer-readable storage media, encoding computer-executable instructions for executing on a computer system a computer process, wherein the computer process further comprising communicating the maps to the mobile device using the communication channel.

An example method comprises pinging a graphical positioning system (GPS) module of a mobile device at a predetermined frequency to receive GPS parameters of the mobile device, and analyzing the GPS parameters of the mobile device to determine if the mobile device is outside a predetermined range, and if it is determined that the mobile device is outside the predetermined range, communicating a notification to the mobile device to download maps on the mobile device.

Another example method further comprises determining the geographic location of the mobile device, if it is determined that the mobile device is outside the predetermined range.

Another example method further comprises determining if the mobile device is capable of communicating using WiFi and if it is determined that the mobile device is capable of communicating using WiFi communicating the notification to the mobile device to download the maps on the mobile device.

In another example method, the predetermined range is a home range for a user of the mobile device. In yet another example method, the predetermined range is based on a subscription plan of the mobile device. In another example method, the predetermined range is a home country of a user of the mobile device.

Another example method further comprises receiving an input from a user of the mobile device including the types of maps to download on the mobile device and in response to the input, downloading the types of maps to the mobile device.

Yet another method further comprises communicating with the mobile device to determine a data download speed available to the mobile device if it is determined that the mobile device is outside the predetermined range, selecting maps based on the available download speed, and pushing the selected maps to the mobile device.

An example system comprises a memory, one or more processor units, a a plurality of maps stored in the memory, each of the plurality of maps related to a geographic location, a GPS parameter processing module stored in the memory and executable by the one or more processor units, the GPS parameter processing module configured to analyze GPS parameters received from a mobile device to determine a location of the mobile device, and a map download module stored in the memory and executable by the one or more processor units, the map download module configured to determine if the mobile device is outside a predetermined range and if it is determined that the mobile device is outside the predetermined range, further configured to send a notification to the mobile device to download one or more of the plurality of maps.

In another example system, the map download module is further configured to determine the geographic location of the mobile device upon determining that the mobile device is outside the predetermined range. In yet another example system, the map download module is further configured to determine the geographic location of the mobile device upon determining that the mobile device is outside the predetermined range. In yet another example system, the map download module is further configured to select the one or more of the plurality of maps based on the geographic location of the mobile device. In yet another example system, the map download module is further configured to select the one or more of the plurality of maps based on one or more preferences of a user of the mobile device.

In yet another example system, the map download module is further configured to determine a communication channel available to the mobile device and to send the maps to the mobile device via the communication channel.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A system comprising:
   memory;
   one or more processor units;
   a plurality of offline maps stored in the memory, each of the plurality of maps related to a geographic location;
   a GPS parameter processing module stored in the memory and executable by the one or more processor units, the GPS parameter processing module configured to analyze GPS parameters received from a mobile device to determine a location of the mobile device; and
   a map download module stored in the memory and executable by the one or more processor units, the map download module configured to send a notification to the mobile device to download one or more of the plurality of offline maps in response to determining that the mobile device is outside the predetermined range, wherein the notification is activated in response to determining that the mobile device is able to communicate using an alternative communication method; wherein the map download module further configured to download the one or more of the plurality of offline maps, wherein the downloaded one or more of the plurality of offline maps are populated with additional information based on past requests for maps by other users at a location of a user of the mobile device.

2. The system of claim 1, wherein the map download module further configured to select the other users based on their preferences.

3. The system of claim 1, wherein the map download module is further configured to determine the geographic location of the mobile device upon determining that the mobile device is outside the predetermined range, wherein the predetermined range is a range within which the mobile device is able to access telecommunications services from a service provider without incurring roaming charges.

4. The system of claim 3, wherein the map download module is further configured to determine the geographic location of the mobile device upon determining that the mobile device is outside the predetermined range and send a notification to download one or more offline maps related to the geographic location of the mobile device.

5. The system of claim 4, wherein the map download module is further configured to select the one or more of the plurality of maps based on the geographic location of the mobile device.

6. The system of claim 4, wherein the map download module is further configured to populate the one or more of the plurality of maps based on the one or more preferences of the user of the mobile device.

7. The system of claim 4, wherein the map download module is further configured to determine a communication channel available to the mobile device that does not incur any roaming charges and to send the maps to the mobile device via the communication channel.

8. A method, comprising:
   pinging a graphical positioning system (GPS) module of a mobile device at a predetermined frequency to receive GPS parameters of the mobile device;
   determining when the mobile device has access to alternative communication method; and
   in response to determining, based on an analysis of the GPS parameters of the mobile device, that the mobile device is outside a predetermined range and that the mobile device has access to alternative communication method, wherein the predetermined range is a range within which the mobile device is able to access telecommunications services from a service provider without incurring roaming charges, presenting a notification to download offline maps on the mobile device, wherein the offline maps are populated with additional information based on past requests for maps by other users at a location of a user of the mobile device.

9. The method of claim 8, further comprising:
in response to determining that the mobile device is outside the predetermined range, determining the geographic location of the mobile device.

10. The method of claim 8, wherein presenting a notification to the mobile device further comprising:
in response to determining that the mobile device is capable of communicating using WiFi, presenting the notification to the mobile device to download the maps on the mobile device.

11. The method of claim 8, wherein the predetermined range is a home range for the user of the mobile device where no roaming charges are applicable.

12. The method of claim 8, wherein the predetermined range is based on a subscription plan of the mobile device.

13. The method of claim 8, wherein the notification further comprises a request to identify types of maps to download on the mobile device.

14. The method of claim 13, further comprising receiving an input from the user of the mobile device including the types of maps to download on the mobile device and in response to the input, downloading the types of maps to the mobile device.

15. The method of claim 8, further comprising:
in response to determining that the mobile device is outside the predetermined range, communicating with the mobile device to determine a data download speed available to the mobile device;
selecting maps based on the available download speed; and
pushing the selected maps to the mobile device.

16. A physical article of manufacture including one or more tangible computer-readable storage media, encoding computer-executable instructions for executing on a computer system a computer process, the computer process comprising:
determining, using graphical positioning system (GPS) parameters of a mobile device, whether the mobile device is outside its home range, wherein the home range is a geographic range within which the mobile device is able to access telecommunications services from a service provider without incurring roaming charges;
determining when the mobile device is able to communicate using an alternative communication method; and
in response to determining that the mobile device is outside its home range and that it is able to communicate using an alternative communication method, communicating a request to a mapping server for one or more offline maps, wherein the requested one or more offline maps are populated with additional information based on past requests for maps by other users at a location of a user of the mobile device.

17. The physical article of manufacture of claim 16, wherein the computer process further comprising determining availability of a communication channel for the mobile device, where the communication channel allows downloading data without incurring data charges for the mobile device.

18. The physical article of manufacture of claim 17, wherein the computer process further comprising communicating the maps to the mobile device using the communication channel.

19. The physical article of manufacture of claim 16, wherein selecting or more maps further comprises selecting one or more maps based on past mapping application usage by the mobile device.

* * * * *